(12) United States Patent
Hanagan (10) Patent No.: US 6,883,629 B2
(45) Date of Patent: Apr. 26, 2005

(54) VEHICLE WITH ONE-SIDED SWING ARM

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 100 days.

(21) Appl. No.: 10/271,424

(22) Filed: Oct. 15, 2002

(65) Prior Publication Data

US 2003/0057006 A1 Mar. 27, 2003

Related U.S. Application Data

(63) Continuation-in-part of application No. 09/836,693, filed on Apr. 17, 2001, now Pat. No. 6,464,030.

(51) Int. Cl.[7] .............................. B62D 61/06
(52) U.S. Cl. ................ 180/211; 180/215; 280/124.128
(58) Field of Search ............................... 180/215, 216, 180/217, 408, 409, 211, 210; 280/124.153, 124.128, 62, 92, 98, 93.512, 771, 93.513

(56) References Cited

U.S. PATENT DOCUMENTS

| | | | |
|---|---|---|---|
| 2,559,379 A | 7/1951 | Szekely | |
| 2,788,858 A | 4/1957 | Hasland et al. | |
| 3,110,352 A | 11/1963 | McClarnen | |
| 3,610,358 A | 10/1971 | Korff | |
| 3,998,288 A | 12/1976 | Aoki | |
| 4,020,914 A | 5/1977 | Trautwein | |
| 4,162,605 A | 7/1979 | Olin et al. | |
| 4,353,567 A | 10/1982 | Weldy | |
| 4,546,997 A | 10/1985 | Smyers | |
| 4,573,546 A | 3/1986 | Irimajiri et al. | |
| 4,589,510 A | 5/1986 | Duerwald et al. | |
| 4,662,467 A | 5/1987 | Arai et al. | |
| 4,697,663 A | 10/1987 | Trautwein | |
| 4,703,824 A | 11/1987 | Irimajiri et al. | |
| 4,778,024 A | 10/1988 | Matsumoto et al. | |
| 4,787,470 A | 11/1988 | Badsey | |
| 4,890,857 A | * 1/1990 | de Cortanze | ................ 280/277 |
| 5,116,069 A | 5/1992 | Miller | |
| 5,238,258 A | 8/1993 | Michaud | |
| 5,248,011 A | 9/1993 | Richards | |
| 5,431,243 A | 7/1995 | Richards | |
| 5,960,901 A | 10/1999 | Hanagan | |
| 6,015,022 A | 1/2000 | Thuliez | |
| 6,367,824 B1 | 4/2002 | Hayashi | |

FOREIGN PATENT DOCUMENTS

| | | |
|---|---|---|
| JP | 59-213572 | 12/1984 |
| JP | 59-213573 | 12/1984 |

\* cited by examiner

Primary Examiner—David R. Dunn (57) ABSTRACT

A vehicle has a chassis with a front and rear ends and at least one front wheel mounted on the front end. A one-sided swing arm having an outer end portion, a support portion including a strut assembly, and an inner end portion is pivotally mounted on the rear end of the chassis. A wheel mounting assembly is disposed on the outer end portion of the swing arm, and a rear wheel which is interchangeable with the front wheel is mounted thereon. In one embodiment, the vehicle includes steering means for pivoting the front wheel about a first vertical axis to control the direction of movement of the vehicle, and a hub and pivot means mounting the hub on the outer end of the swing arm for pivotal movement of the rear wheel about a second vertical axis. The rear wheel is rotatably supported on the hub and naturally tracks the front wheel in a cooperating turning arc.

16 Claims, 13 Drawing Sheets

VEHICLE WITH ONE-SIDED SWING ARM

CROSS REFERENCE TO RELATED APPLICATION

This application is a continuation-in-part of U.S. application Ser. No. 09/836,693 filed Apr. 17, 2001, now U.S. Pat. No. 6,464,030 granted Oct. 15, 2002.

BACKGROUND OF THE INVENTION

The present invention relates to vehicles, and, more particularly, to vehicles which utilize swing arms for supporting the rear wheel or wheels.

Three wheeled vehicles such as compact automobiles generally have a steering system connected only to the front wheel or wheels. For automobiles having two wheels in front and a single wheel in back, the back wheel is preferably mounted on a swing arm which includes a shock absorber and a pivot mechanism which allows the wheel some degree of pivoting about a horizontal axis. On front wheel drive cars, prior known swing arms for a central rear wheel are two sided and therefore require a different type of wheel mounting arrangement for the rear wheel than that used in front. It would be useful to develop a lightweight swing arm that could accommodate the same type of wheel on the back of the vehicle as is used in front.

An object of the invention is to provide a novel three or four wheeled, front wheel drive vehicle in which all of the wheels are interchangeable.

Another object is to provide such a vehicle which uses standard wheel bearings for the rear wheels.

A further object is to provide such a vehicle in which the rear wheels can be easily removed.

A further object is to provide such a vehicle in which the rear tires can be changed by the driver.

Yet another object is to provide such a vehicle which has a lightweight suspension system.

A further object is to provide a three wheeled vehicle with a rear wheel assembly which enables the rear wheel to pivot about a generally vertical axis to track more closely the turning radius of the front wheels.

SUMMARY OF THE INVENTION

It has now been found that the foregoing and related objects may be readily attained in a vehicle which has a chassis with front and rear ends and a longitudinal axis. Two front wheels are mounted on the front end of the chassis. A motor operatively connected to drive the front wheels is also mounted on the chassis. A one-sided swing arm has an outer end portion, a support portion comprising a strut assembly, and an inner end portion pivotally mounted on the rear end of the chassis for pivoting about a first horizontal axis perpendicular to the longitudinal axis. A wheel mounting assembly is included on the outer end portion of the swing arm, and a rear wheel is mounted to the wheel mounting assembly. The rear wheel is interchangeable with the front wheels.

Preferably, the strut assembly is made of aluminum and includes an upper longitudinal portion, a lower longitudinal portion, and strut means connecting the upper and lower longitudinal portions. The strut assembly preferably further includes a lower lateral portion and means connecting the lower lateral portion to the inner end portion. Desirably, the upper longitudinal portion, lower longitudinal portion and lower lateral portion are tubular.

The vehicle preferably includes a shock absorber having one end connected to the chassis and its other end connected to the swing arm for limiting the pivotal movement of the swing arm about the first horizontal axis.

Desirably, the vehicle includes first bearing means for mounting the swing arm to the chassis. The rear wheel desirably has a swing arm side and a lug nut side, and the vehicle further comprises brake means disposed on the swing arm side of the rear wheel.

The vehicle usually includes steering means for pivoting the front wheel about a first vertical axis to control the direction of movement of the vehicle. The wheel mounting assembly generally includes a hub and pivot means mounting the hub on the outer end of the swing arm for pivotal movement about a second vertical axis. Preferably, the rear wheel naturally tracks the front wheel in a cooperating turning arc.

In one preferred form of the invention, a dampening mechanism having a rear end pivotally mounted to the pivot means and a front and pivotally mounted on the swing arm provides tension and resists movement of the hub about the second vertical axis.

DETAILED DESCRIPTION OF THE PREFERRED EMBODIMENT

Figure 1:
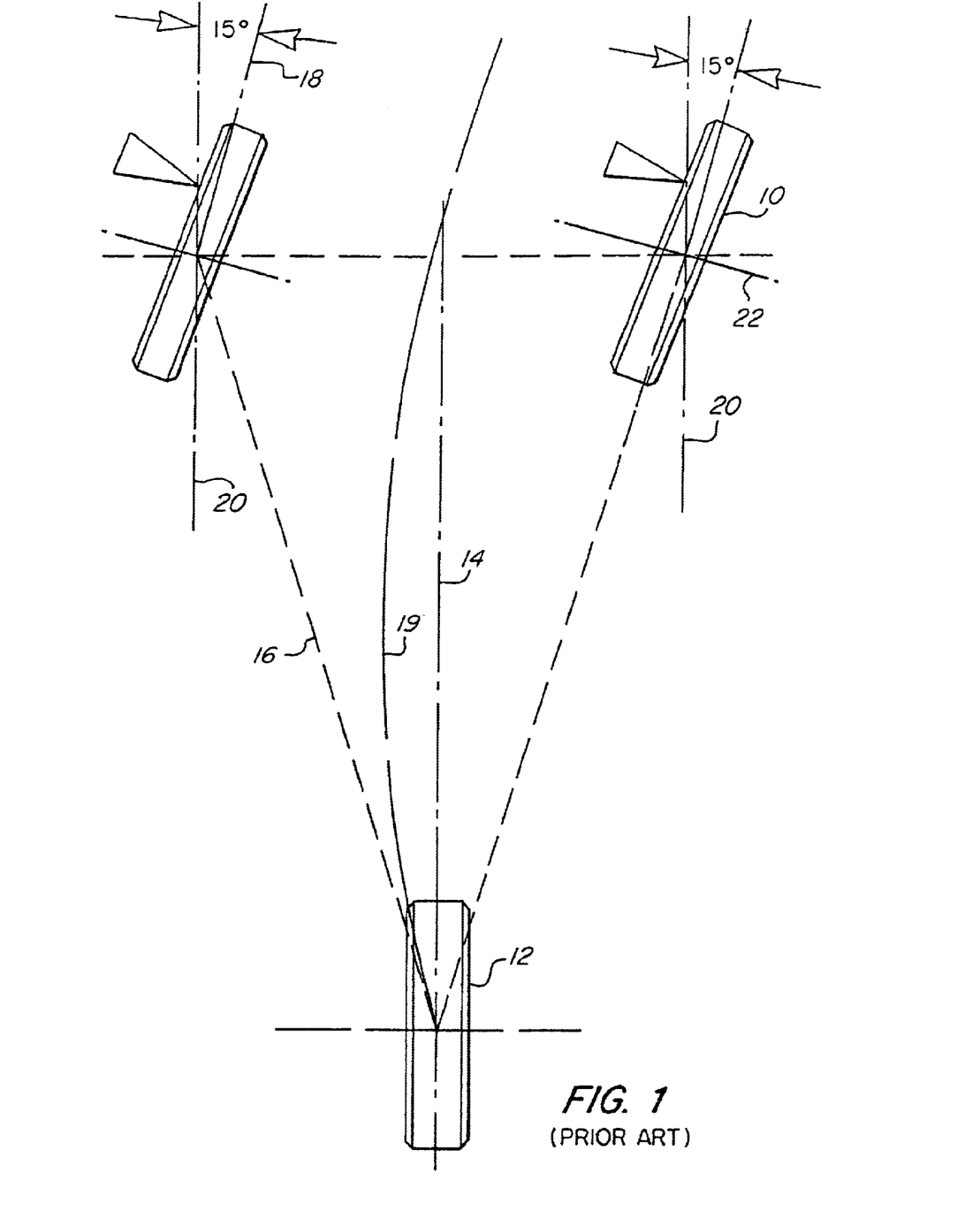
FIG. 1 is a diagrammatic view of the dragging action on the rear tire of a conventional swing arm wheel mounting assembly during turning of the vehicle.

Turning to FIG. 1, therein illustrated diagramatically is the effect on a fixed rear wheel 12 upon the turning of the pivotably mounted front wheels 10. The longitudinal centerline of the vehicle is designated by the numeral 14 and parallel lines through the center of the front wheels are designated by the numeral 20. The front wheels 10 are effectively tracking at an angle of about 15° along the lines 18 which are perpendicular to the axes of rotation of the wheels 10. Because the rear wheel 12 is fixed on the longitudinal axis 14, it is dragged sideways as the front end of the vehicle turns and tracks along the turning arc designated by the numeral 18.

Figure 2:
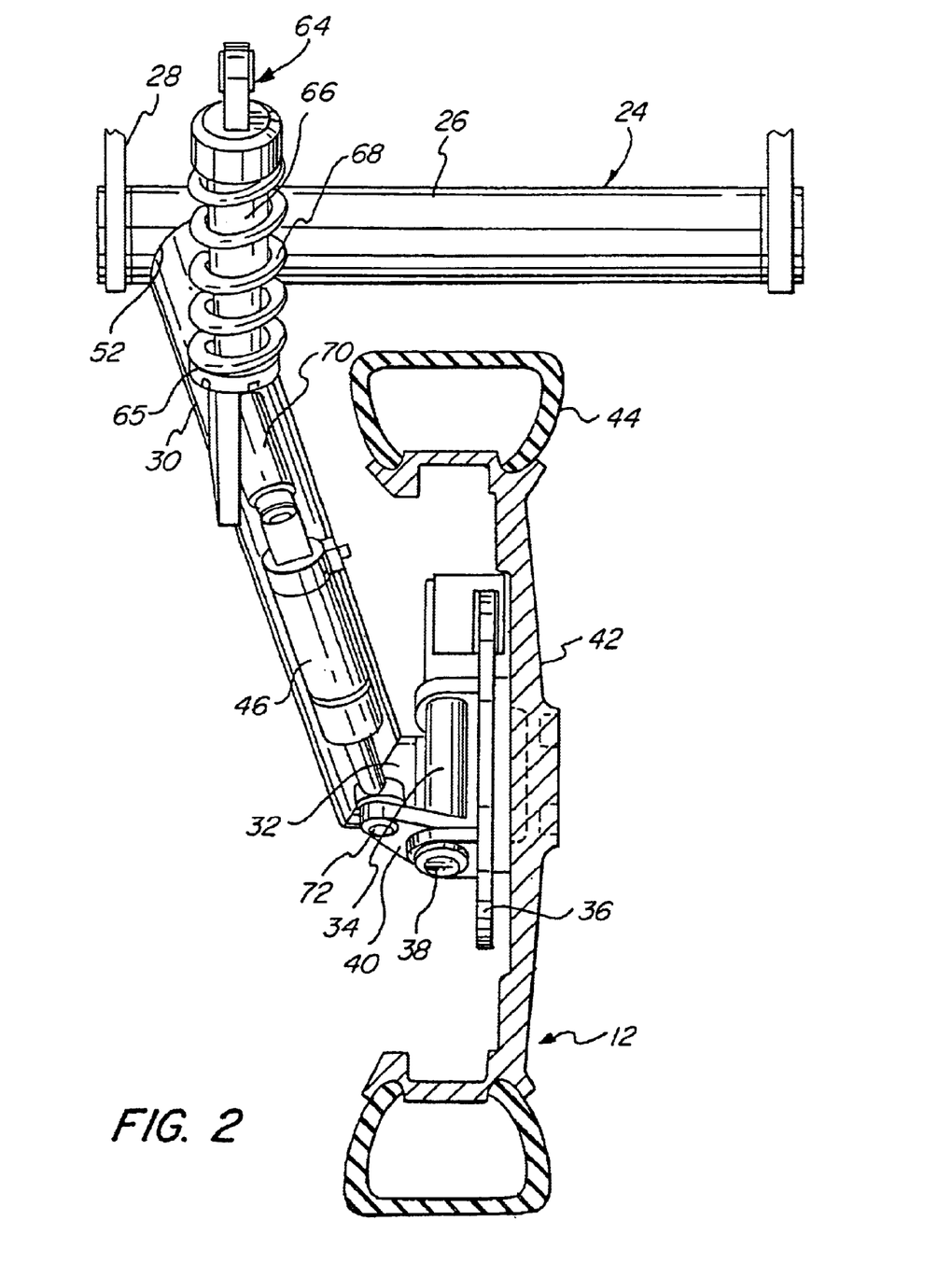
FIG. 2 is a top view of a swing arm wheel mounting assembly embodying one preferred form of the present invention with the wheel and tire broken away to permit illustration of the hub and bell crank assembly.
Figure 3:
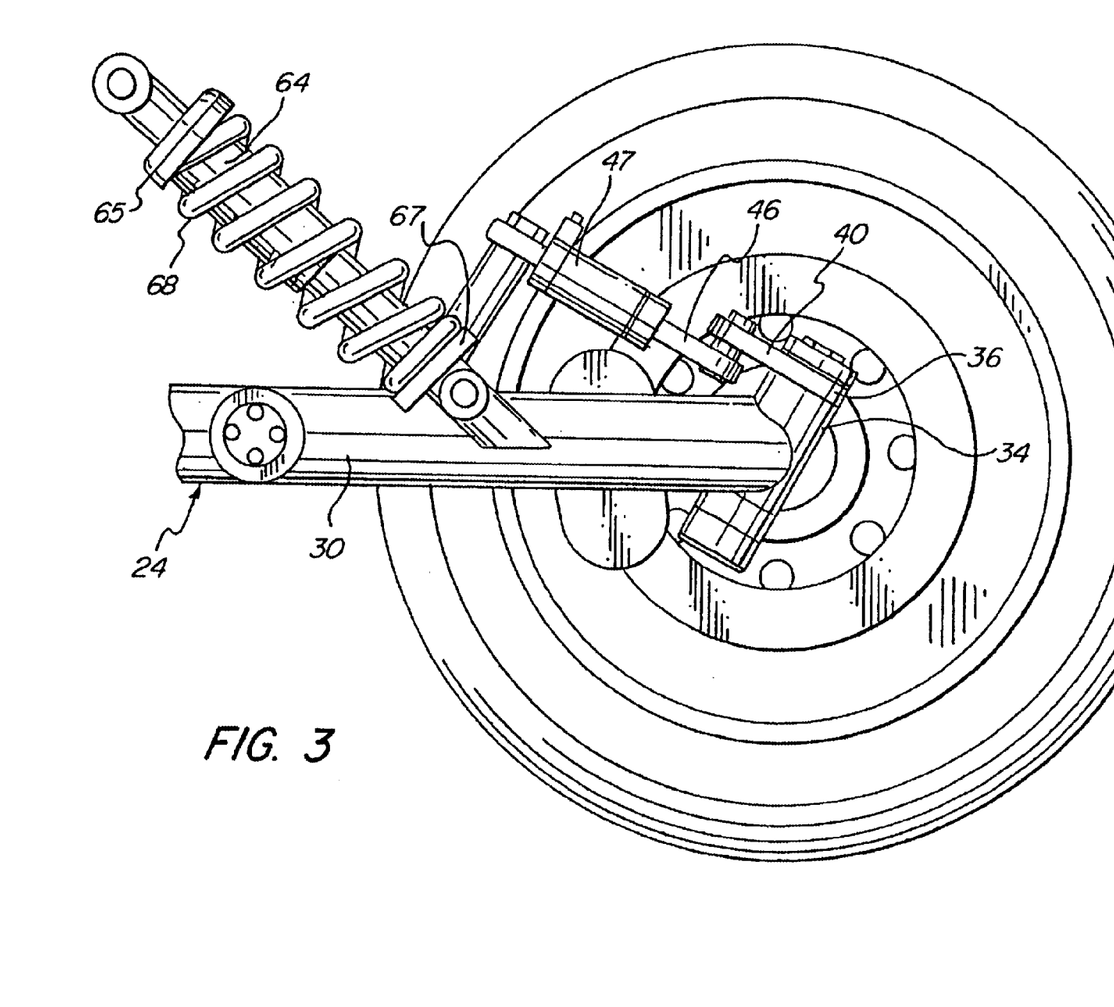
FIG. 3 is a fragmentary side elevational view of the swing arm/wheel mounting assembly shown in FIG. 2.
Figure 4:
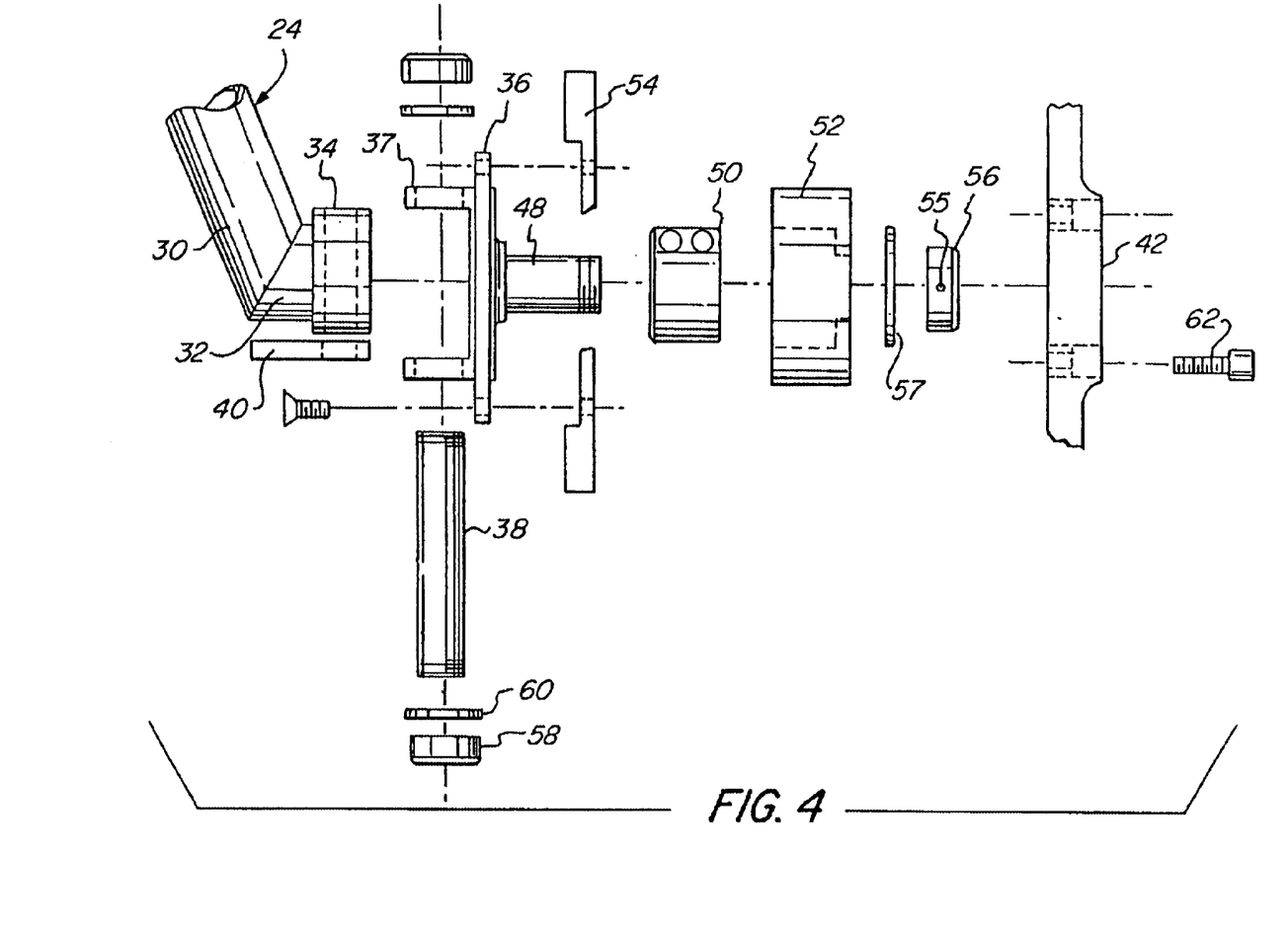
FIG. 4 is an exploded view of the components of the assembly shown in FIG. 2 excluding the dampening cylinder and shock assembly and with the swing arm only fragmentarily illustrated.
Figure 5:
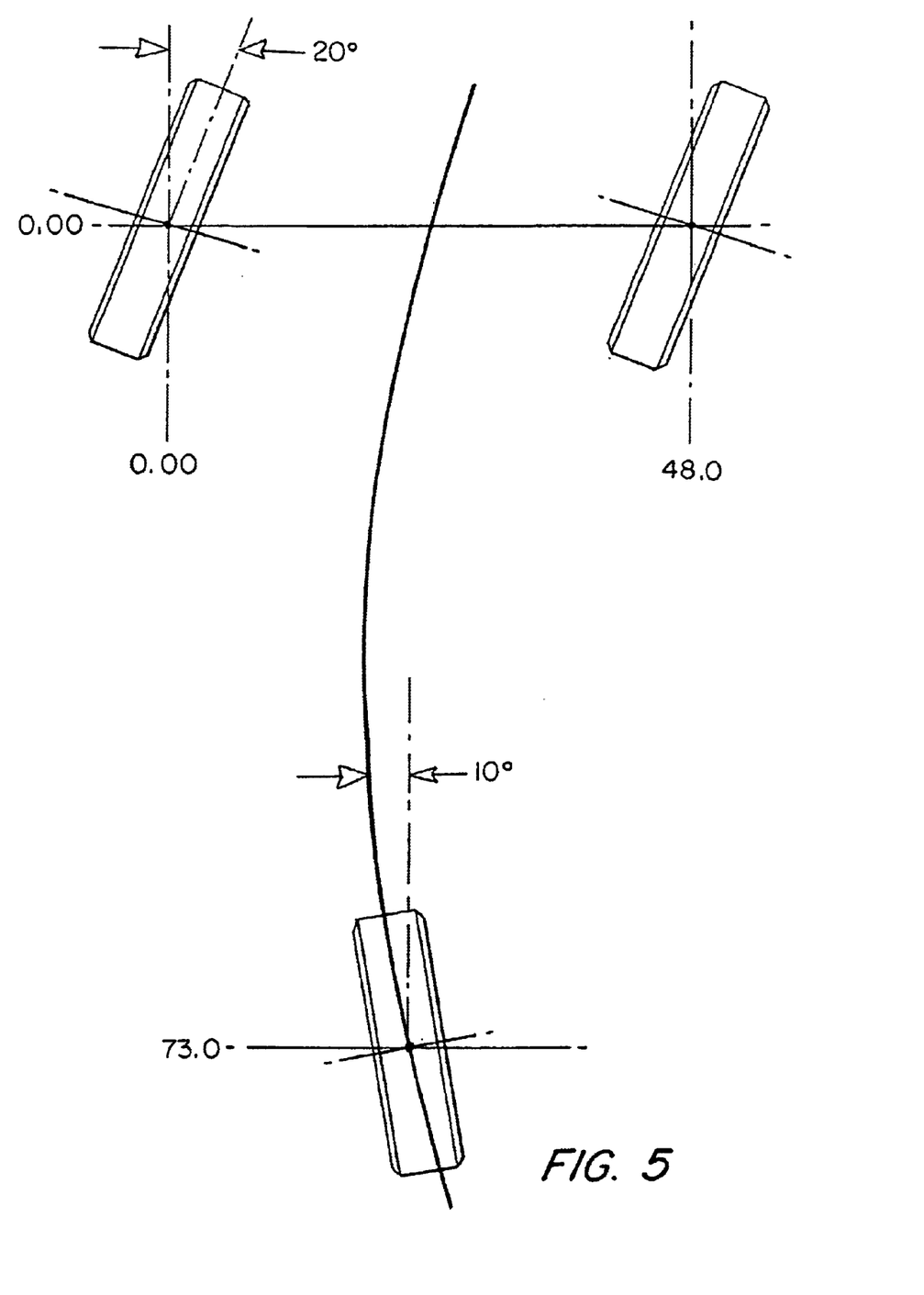
FIG. 5 is a diagrammatic view of the improved path of tracking movement of the rear tire provided by the embodiment shown in FIG. 2.

Turning now to FIGS. 2–4 therein illustrated is a swing arm assembly which enables the rear wheel 12 to pivot about a vertical axis as a result of the lateral forces exerted thereon by the turning motion. The swing arm assembly is generally designated by the numeral 24 and includes the tubular shaft 26 which is pivotably supported between the brackets 28 on the vehicle chassis (not shown). Extending rearwardly at an angle from the shaft 26 is the tubular swing arm 30 which has at its rearward end a laterally extending intermediate portion 32 and a tubular coupling 34 which is pivotably supported between the ears 37 of the clevis member generally designated by the numeral 36 by the pivot or king pin 38.

On the opposite side of the clevis member 36 is the axle 48 upon which is disposed the bearing 50, the hub 52 and washer 57, all of which are secured to the axle 48 by the lock nut 56 and cotter pin 55. The wheel 42 is secured to the hub 52 by the lug bolts 62.

Also secured to the clevis member 36 by the bolts 53 is the rotor 54. Extending about the wheel 42 is the tire 44.

Also mounted on the clevis 36 by the king pin 38 is a crank arm 40 which is keyed to the king pin 38. The outer end of the crank arm 40 supports one end of the piston 46 in the dampening cylinder assembly 47. The other end of the cylinder assembly 47 is supported in the bracket 70 on the swing arm 30 adjacent its forward end.

As seen in FIG. 2, a shock absorber assembly 64 is also provided. Its lower end is coupled to the swing arm 30 and its upper end is coupled to the chassis (not shown), and the coil spring 68 absorbs forces as it is compressed between the collars 65, 67 on the strut 66 during pivoting of the swing arm about the horizontal axis of its mounting to the chassis in accordance with conventional practice.

Figure 11:
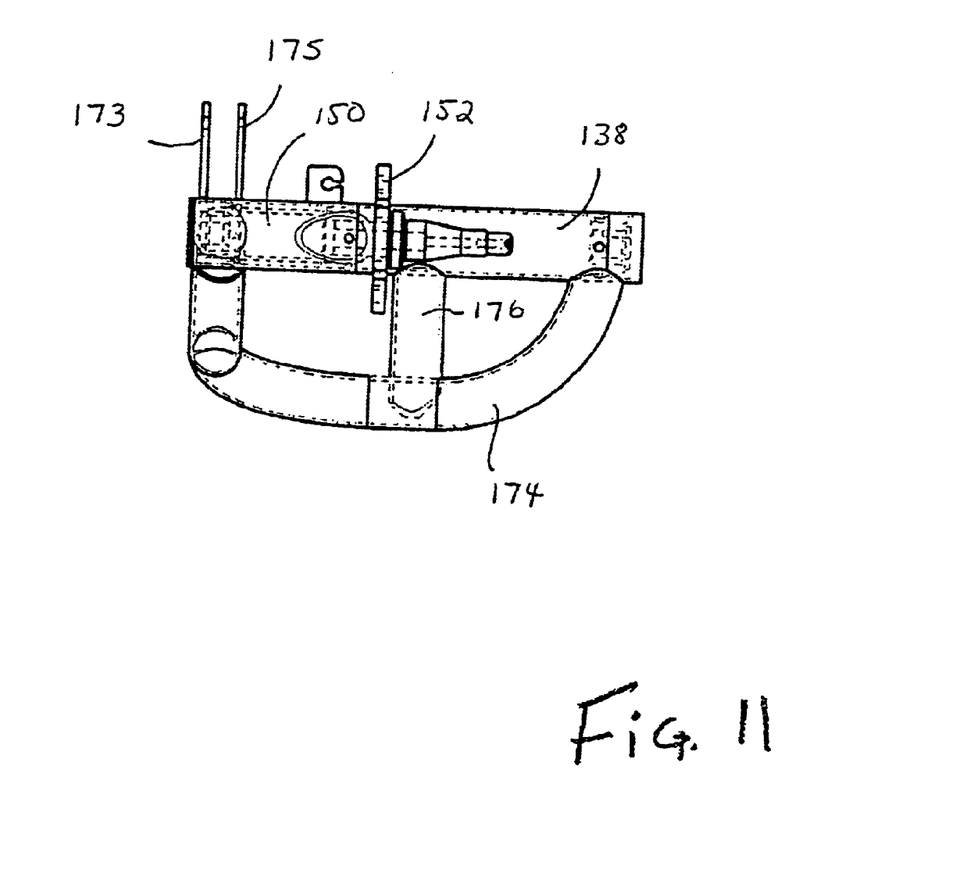
FIG. 11 is a rear elevational view of the one-sided swing arm.

In the operation of this embodiment, the swing arm moves about its pivotal axis on the chassis in its usual manner, and the shock absorber will reduce the oscillation produced by vertical forces caused by bumps, holes and the like. When the driver turns the front wheel(s) in any direction, there is a lateral force applied to rear wheel. This lateral force causes pivoting of the wheel assembly about the generally vertical axis of the king pin to allow the rear wheel to follow an arcuate path cooperating with that of the front wheels as is shown in FIG. 11. This pivotal action is limited by the dampening piston cylinder arrangement which returns the rear wheel to its vertical position along the longitudinal axis when the side pressure is reduced or terminated.

Figure 6:
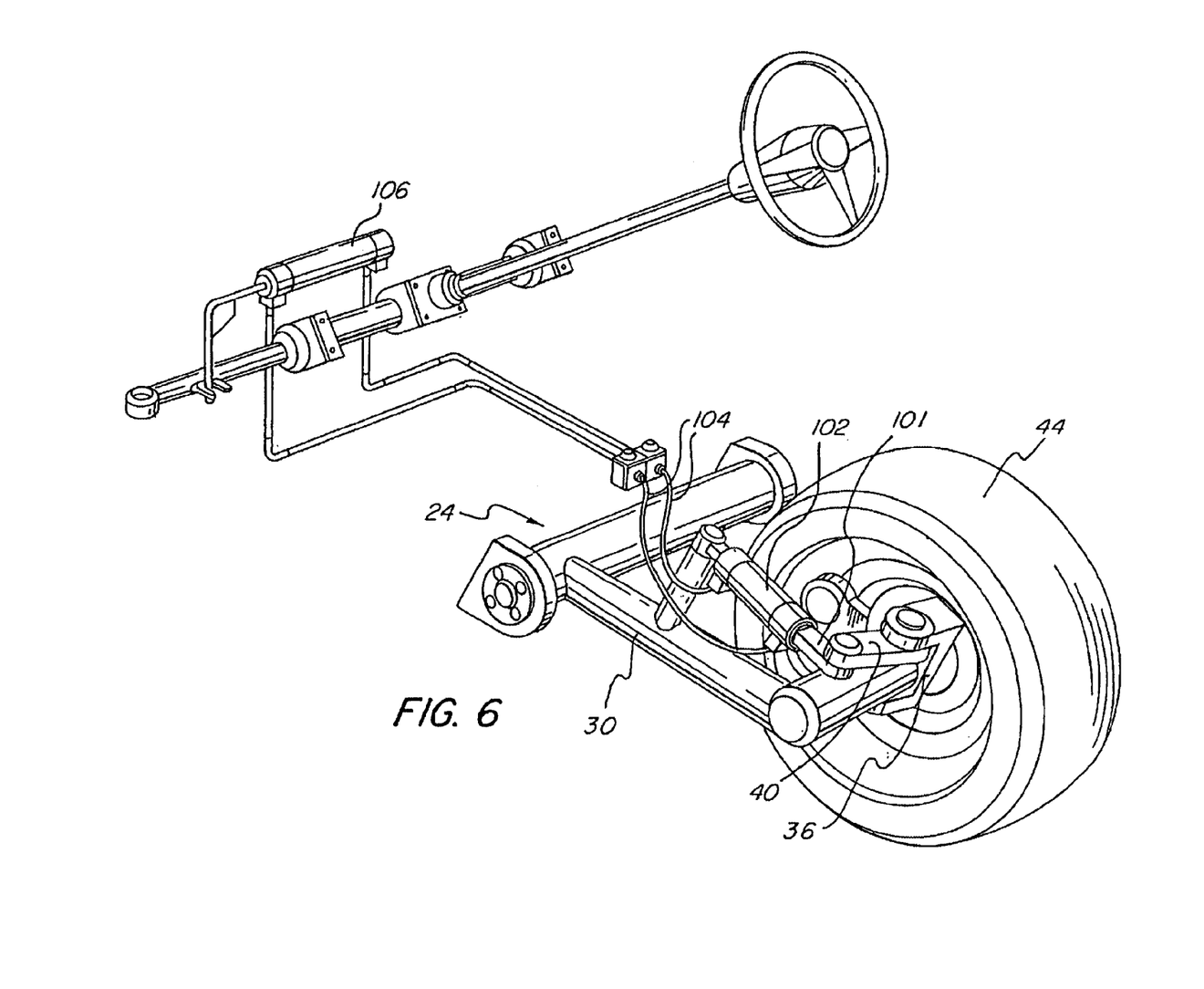
FIG. 6 is a perspective view of the present invention in an embodiment in which the hydraulic cylinder on the bell crank is coupled hydraulically to the front wheel steering assembly.
Figure 7:
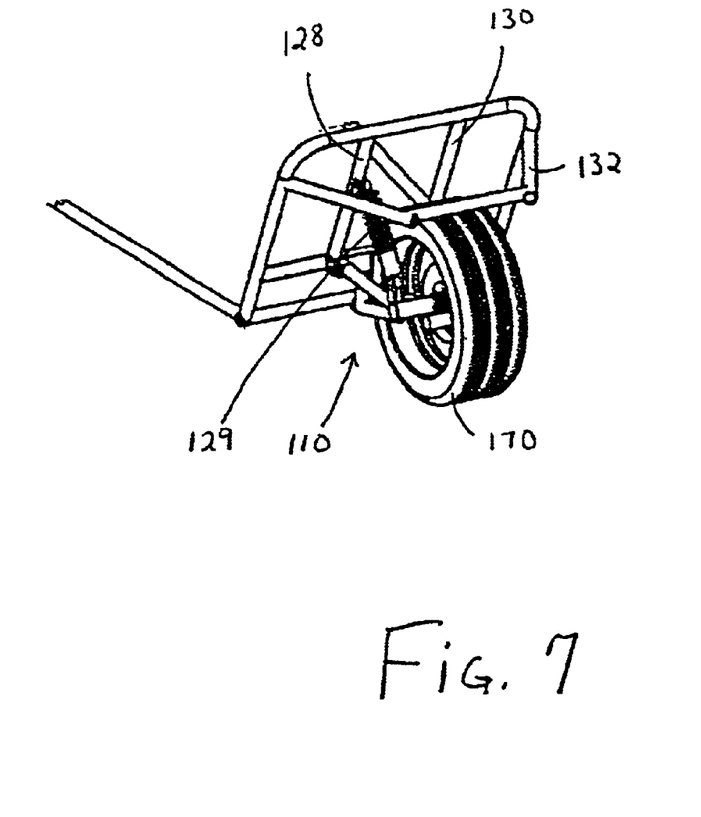
FIG. 7 is a fragmentary perspective view showing the chassis, central rear wheel and one-sided swing arm for a vehicle according to a second embodiment of the invention.
Figure 8:
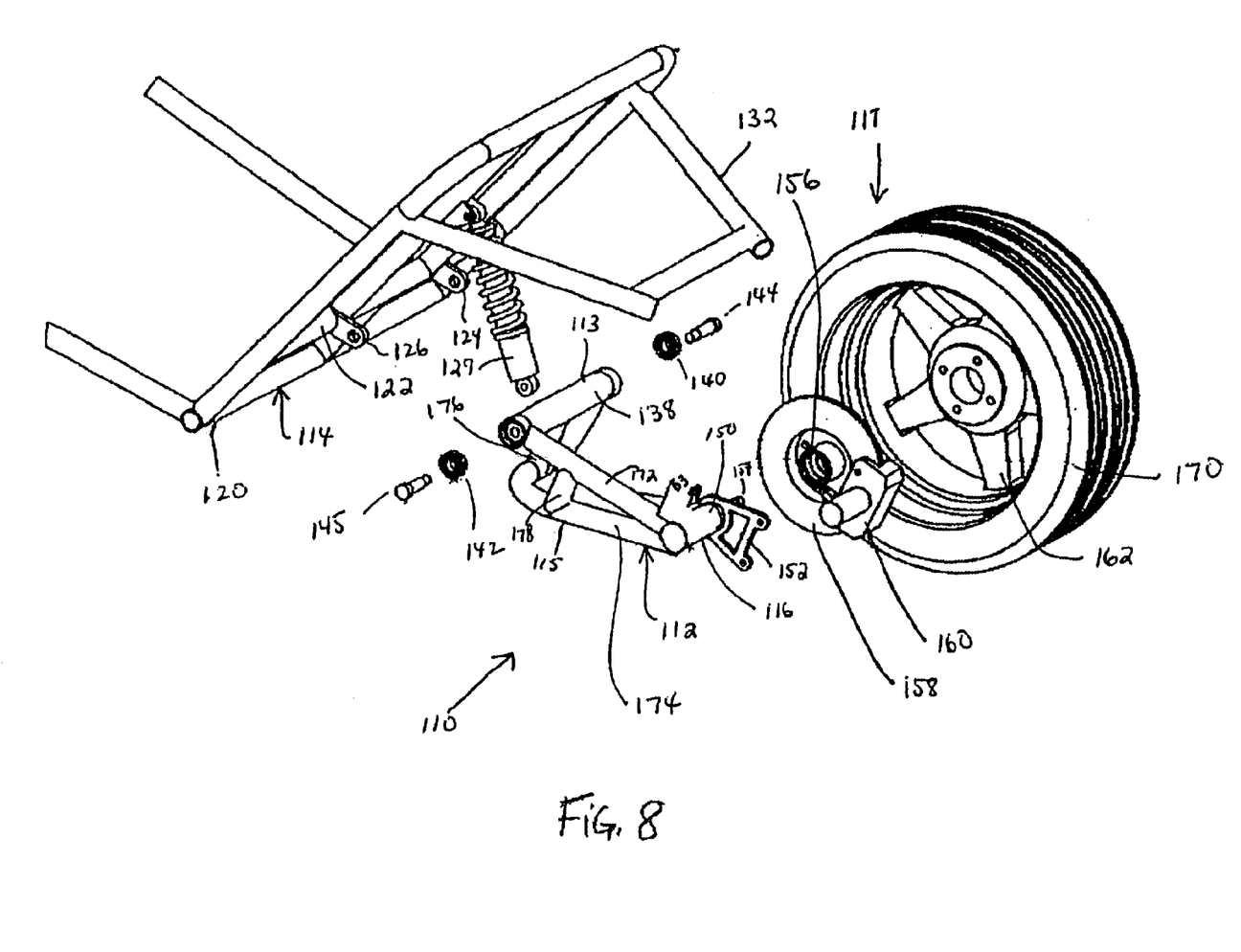
FIG. 8 is an exploded perspective view showing the chassis, one-sided swing arm, wheel mounting assembly, and wheel for the embodiment shown in FIG. 7.
Figure 9:
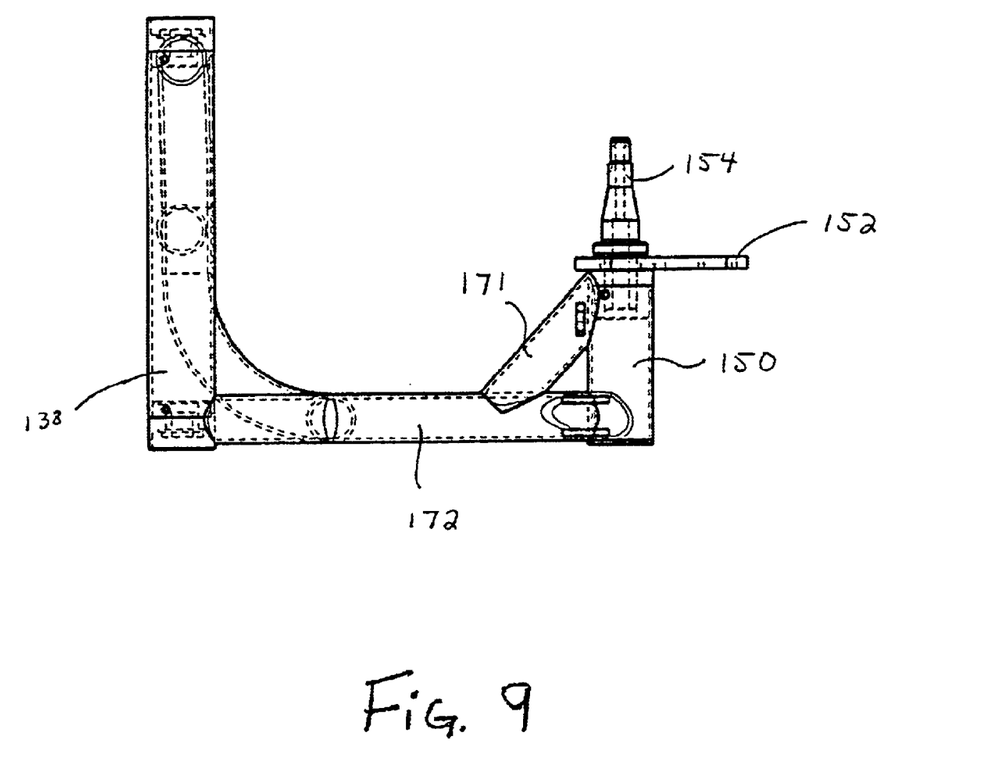
FIG. 9 is a top view of the one-sided swing arm.
Figure 10:
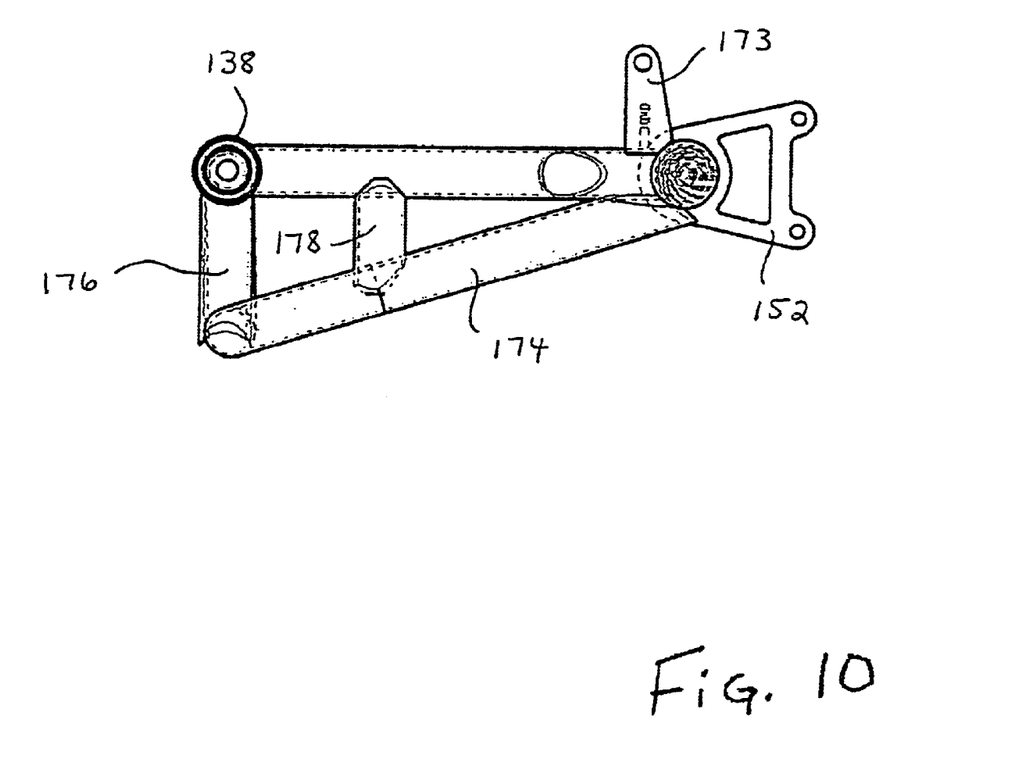
FIG. 10 is a side elevational view of the one-sided swing arm.

Turning now to the embodiment of FIG. 6, the dampening piston/cylinder 46, 47 have been replaced by a steering piston/cylinder 101, 102. Hoses 104 are connected to the hydraulic steering system 106 for the front wheels 10. When the operator acts to turn the front wheels 10, hydraulic fluid is also acting on the piston 101 in the cylinder 102 which in turn applies a pivotal force to the bell crank 40 to effect pivoting of the rear wheel about the king pin of the rear wheel assembly.

It will be readily appreciated that not all elements of the rear wheel mounting system have been illustrated such as calipers and other brake elements. Moreover, various of the components may be made from reinforced synthetic resins.

The improved tracking of the rear wheel will facilitate a rapid and safe turn, and reduce the wear on the rear tire. In the preferred embodiment, the hydraulic coupling of the rear wheel assembly to the front wheel assembly provides faster response.

Turning to FIGS. 7–12, another embodiment of a swing arm assembly is shown and is designated as 110. The swing arm assembly 110 is particularly well-suited for use in supporting a central rear wheel on a three wheeled vehicle, but also can be used on four wheeled vehicles, and on vehicles having a single front wheel. The swing arm assembly 110 includes a lightweight, rigid, one-sided swing arm 112 having an inner end portion 113 connected to a chassis 114, a central support portion 115, and an outer end portion 116 supporting a rear wheel assembly 117.

The chassis 114 includes a rectangular support frame 120 with a central, horizontal, swing arm support bar 122 having rearwardly extending brackets 124,126. A shock absorber support bar 128 extends upwardly from the swing arm support bar 122 and supports the upper end of a shock absorber 129. The chassis 114 also includes a parallel support bar 130 extending upwardly from the swing arm support bar 122 in parallel to the shock absorber support bar 128, and a parallelogram-shaped fender support 132 extending rearwardly from the upper end of the rectangular support frame 120.

A shown in FIGS. 8–11, a rotatable shaft 138 is included as part of the inner end portion 113 of the swing arm 112 and is mounted between the brackets 124, 126 of the swing arm support bar 122 with bearings 140, 142 and bolts 144,145. The central support portion 115 of the swing arm 112 extends rearwardly from the shaft 138 on only one side of the wheel and connects to the laterally extending outer end portion 116, which is parallel to the shaft 138. The outer end portion 116 includes a horizontal member 150 which supports a flange 152. On the opposite side of the flange 152 is the axle 154 upon which is disposed the bearing 156, the hub 158 which supports the brake caliper 160, all of which are secured to the axle 154 by a lock nut and cotter pin (not shown). The wheel 162 is secured to the hub 158 by lug bolts 164 and lug nuts 166. The lug bolts 164 also secure the hub 158 to the flange 152. Extending about the wheel 162 is the tire 170.

Swing arm 112 is one-sided in that the central support portion 115 extends rearwardly on only one side of the wheel, thereby enabling the wheel to be conveniently removed from the lug nut side. In contrast, prior known designs of three-wheeled vehicles have usually employed a two-sided swing arm, i.e., support bars on both sides of the wheel, when a single rear wheel was used on a front wheel drive vehicle. The central support portion 115 of the swing arm 112 comprises a strut assembly that includes a connecting member 172 which is fixed to the left ends of both the horizontal member 150 and the shaft 138 and is perpendicular to each, and a curved lower support member 174 which connects the right end of shaft 138 to the left end of horizontal member 150, thereby providing additional structural support to the connecting member 172. Bar 171 provides added support between connecting member 172 and horizontal member 150. Upwardly extending ears 173,175 positioned at the rearward end of the connecting member 172 support the lower end of the shock absorber 129. Generally vertical cross bars 176, 178 connect the lower support member 174 to the rotatable shaft 138 and connecting member 172, respectively, to further support the connecting member 172. This configuration provides the swing arm with the necessary strength and stability when it is made of a lightweight material, such as aluminum tubing.

Figure 12:
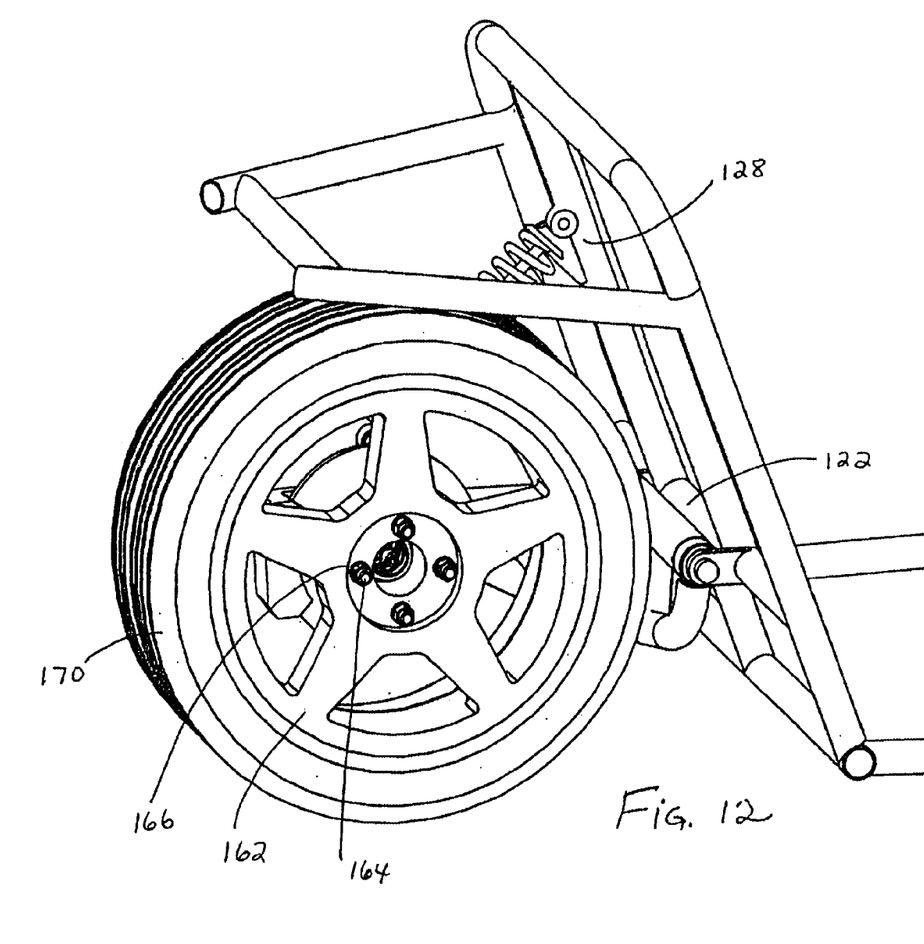
FIG. 12 is a perspective view of the lug nut side of the third wheel for the embodiment shown In FIG. 7.

By employing a one-sided swing arm, the only mechanical parts on the lug nut side of the wheel are the other ends of the bolts 164 and the lug nuts 166 themselves, as is shown in FIG. 12. As a result, the same type of wheel that is used on the front of the vehicle can be used on the rear. The vehicle therefore only needs to carry one type of spare tire and any of the wheels can be changed by the operator. This is in contrast to prior known front wheel drive three-wheeled vehicles in which a skilled mechanic was needed to remove the rear wheel.

By using the strut construction for the swing arm, the mass can be significantly reduced while maintaining rigidity. This increases the rate of response to dynamic loads acting on the suspension and also improves cornering. Moreover, by eliminating a rear axle when two rear wheels are provided, the chassis of the vehicle can be closer to the ground for stability.

Figure 13:
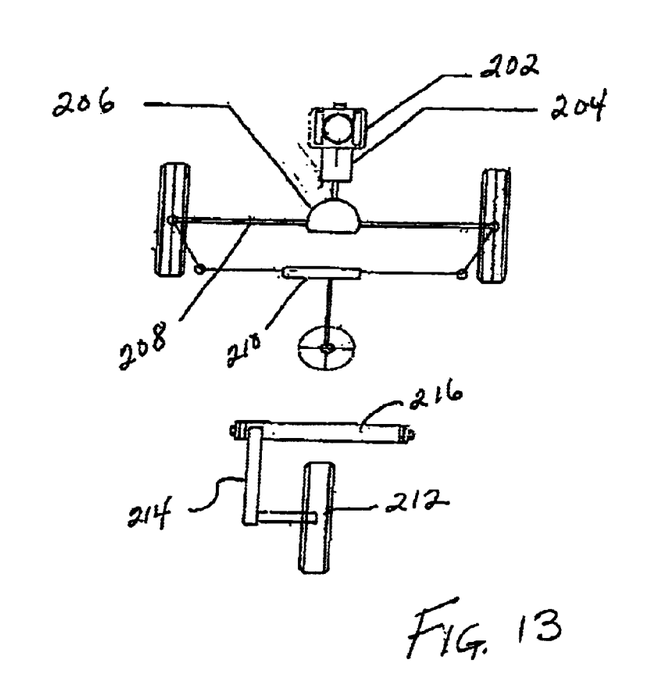
FIG. 13 is a diagrammatic illustration of the wheels, motor, drive couplings, and steering assembly.

Turning to FIG. 13, there is schematically illustrated a conventional drive system for the front wheels 200 including the motor 202, gear box 204, differential 206 and drive shafts 208. A conventional steering mechanism 210 such as that illustrated in FIG. 6 steers the front wheels 200. The rear wheel 212 is supported on the swing arm 214 which in turn is supported on the shaft 216 which is mounted on the chassis (not shown).

Thus, it can be seen from the foregoing detailed specification and drawings that the one-sided swing arm of the present invention provides for interchangeability of all three tires on the vehicle and, enables an operator to easily and conveniently remove the third wheel from the vehicle without a mechanic. Furthermore, when combined with a pivotable third wheel at the back of the vehicle, the wheel can track the arc of the front wheel rather than scuffing, and thereby providing better control of the vehicle during turning.

Having thus described the invention, what is claimed is:

1. A three wheeled vehicle comprising:
   (a) a chassis having front and rear ends and a longitudinal axis;
   (b) two front wheels mounted on said front end of said chassis;
   (c) a motor mounted on said chassis, said motor being operatively connected to drive said front wheels;
   (d) a one-sided swing arm having an outer end portion, a support portion comprising a strut assembly, and an inner end portion pivotally mounted to said rear end of said chassis for pivoting about a first horizontal axis perpendicular to said longitudinal axis, said strut assembly including an upper longitudinal member, a lower longitudinal member, and generally at least one vertical member connecting the upper and lower longitudinal members;
   (e) a shock absorber having one end connected to said chassis and its other end connected to said swing arm for limiting the pivotal movement of said swing arm about said first horizontal axis.
   (f) a wheel mounting assembly on one side of said outer end portion of said swing arm; and
   (g) a rear wheel mounted on said wheel mounting assembly, said rear wheel being interchangeable with said front wheels.

2. The vehicle in accordance with claim 1 wherein the strut assembly further includes a lower lateral portion and means connecting the lower lateral portion to the inner end portion.

3. The vehicle in accordance with claim 2 wherein said upper longitudinal member, lower longitudinal member and lower lateral portion are tubular.

4. The vehicle in accordance with claim 1 wherein said swing arm is fabricated of aluminum.

5. The vehicle in accordance with claim 1 further comprising bearing means mounting said swing arm on said chassis.

6. The vehicle in accordance with claim 1 wherein said rear wheel has a swing arm side and a lug nut side, and said vehicle further comprises brake means disposed on said swing arm side of said rear wheel.

7. The vehicle in accordance with claim 1 further comprising steering means for pivoting said front wheels about vertical axes to control the direction of movement of the vehicle.

8. The vehicle in accordance with claim 7 wherein said wheel mounting assembly includes a hub and pivot means mounting said hub on said outer end of said swing arm for pivotal movement about a vertical axis.

9. The vehicle in accordance with claim 8 wherein said rear wheel naturally tracks said front wheel in a cooperating turning arc.

10. The vehicle in accordance with claim 9 wherein there is included a dampening mechanism having a rear end pivotaily mounted to said pivot means and a front end pivotally mounted on said swing arm for providing tension and resisting movement of said hub about said vertical axis.

11. A vehicle comprising:
   (a) a chassis having front and rear ends and a longitudinal axis;
   (b) two front wheels mounted on said front end of said chassis;
   (c) a motor mounted on said chassis, said motor being operatively connected to drive said front wheels;
   (d) a one-sided swing arm having an outer end portion, a support portion comprising a strut assembly, and an inner end portion pivotally mounted to said rear end of said chassis for pivoting about a first horizontal axis perpendicular to said longitudinal axis, said strut assembly including an upper longitudinal member, a lower longitudinal member, and generally at least one vertical member connecting the upper and lower longitudinal members;
   (e) a wheel mounting assembly on said outer end portion of said swing arm, said wheel mounting assembly includes a hub and pivot means mounting said hub on said outer end of said swing arm for pivotal movement about a vertical axis;
   (f) a shock absorber having one end connected to said chassis and its other end connected to said swing arm for limiting the pivotal movement of said swing arm about said first horizontal axis,
   (g) a rear wheel mounted on said wheel mounting assembly, said rear wheel being interchangeable with said front wheels; and
   (h) steering means for pivoting said front wheels about vertical axes to control the direction of movement of the vehicle.

12. The vehicle in accordance with claim 11 wherein said rear wheel naturally tracks said front wheels in a cooperating turning arc.

13. The vehicle in accordance with claim 12 wherein there is included a dampening mechanism having a rear end pivotally mounted to said pivot means and a front end pivotally mounted on said swing arm for providing tension and resisting movement of said hub about said vertical axis.

14. The vehicle in accordance with claim 11 wherein the strut assembly further includes a lower lateral portion and means connecting the lower lateral portion to the inner end portion.

15. The vehicle in accordance with claim 11 wherein said upper longitudinal member, lower longitudinal member and lower lateral portion are tubular.

16. The vehicle in accordance with claim 11 wherein said rear wheel has a swing arm side and a lug nut side, and said vehicle further comprises brake means disposed on said swing arm side of said rear wheel.

* * * * *